(12) United States Patent
Saito

(10) Patent No.: US 6,738,717 B2
(45) Date of Patent: May 18, 2004

(54) CRYSTAL STRUCTURE ANALYSIS METHOD

(75) Inventor: Keisuke Saito, Yokohama (JP)

(73) Assignee: PANalytical B.V., Ea Almelo (NL)

( * ) Notice: Subject to any disclaimer, the term of this patent is extended or adjusted under 35 U.S.C. 154(b) by 0 days.

(21) Appl. No.: 09/817,973

(22) Filed: Mar. 27, 2001

(65) Prior Publication Data

US 2002/0082781 A1 Jun. 27, 2002

(51) Int. Cl.$^7$ ................................................. G01B 5/28
(52) U.S. Cl. ......................... 702/40; 702/36; 73/579; 378/77
(58) Field of Search ................... 378/171, 71, 73, 378/77, 81; 73/579, 594, 800, 808; 702/36, 40

(56) References Cited

U.S. PATENT DOCUMENTS 6,198,796 B1 * 3/2001 Yokoyama et al. ........... 378/73

* cited by examiner

*Primary Examiner*—John Barlow
*Assistant Examiner*—Stephen J. Cherry
(74) *Attorney, Agent, or Firm*—Blakely, Sokoloff, Taylor & Zafman

(57) ABSTRACT

The invention provides a crystal structure analysis method so as to analyze crystal structures in detail.

The inventive method comprises incrementing the tilting angle ψ of the SBT thin film 1 by one degree in a range of 0 degree $\leq y \leq 90$ degrees, for each of the increments of the tilting angle ψ irradiating the X-ray onto the SBT thin film with the incident angle θ being incremented by 0.025 degrees in a range of 0 degree $\leq \theta \leq 90$ degrees and detecting the X-rays diffracted from the SBT thin film 1 by the detector 3.

10 Claims, 2 Drawing Sheets

CRYSTAL STRUCTURE ANALYSIS METHOD

TECHNICAL FIELD

The invention relates to a method of analyzing a crystal structure of a specimen based on the strength of the X-rays that are diffracted from the specimen after the irradiation of the X-rays on the specimen having a crystal structure.

BACKGROUND OF THE INVENTION

A X-ray diffraction method using θ-2θ scan with X-ray is well known as a method for analyzing crystal phases of crystalline thin films.

Crystalline thin films may often contain different crystal phases dependent on the film-forming conditions. For example, when a thin film of $SrBi_2Ta_2O_9$ (hereinafter referred to as SBT) is formed on a $Pt/TiO_2/(001)Si$ substrate, it is well known that this SBT thin film has in most cases a crystal phase called SBT phase, but in some cases it also has a so-called fluorite phase, which is a different crystal phase from the SBT phase, dependent on the film-forming conditions. It is quite difficult for the conventional X-ray diffraction method to distinguish between the SBT phase and the fluorite phase because the diffraction angles (2θ) of SBT phase and fluorite phase are similar. Thus, there exists a problem of difficulty in analyzing crystal structures in detail using the conventional X-ray diffraction method if the diffraction rays from different crystal phases appear within an approximately same angle.

In view of the above-mentioned background, it is an objective of the invention to provide a crystal structure analysis method for analyzing crystal structures in detail.

SUMMARY OF THE INVENTION

A crystal structure analysis method provided by the invention in order to achieve the above-described objective comprises the steps of irradiating X-rays onto a specimen having a crystal structure, detecting the said X-rays that are diffracted from the said specimen and analyzing the said crystal structure of the said specimen based on the strength of the said detected X-rays, wherein the said step of analyzing the said crystal structure of the said specimen is performed based on the strength of first X-rays diffracted from first crystallographic planes that align so as to keep a first crystallographic plane distance between each other and the strength of second X-rays diffracted from second crystallographic planes that extend diagonally relative to the said first crystallographic planes and align so as to keep a second crystallographic plane distance between each other.

According to the invention, in order to analyze the crystal structure of the specimen, not only the strength of the first X-rays diffracted from the first crystallographic planes that align keeping said first crystallographic planes at a distance from each other but also the strength of the second X-rays diffracted from the second crystallographic planes that extend diagonally relative to the said first crystallographic planes and align keeping a second crystallographic plane distance each other are detected. In such way to detect the strength of the X-rays diffracted from the first and second crystallographic planes that extend diagonally each other, the crystal structure can be analyzed more in detail in the inventive method than in the conventional method.

Besides, the inventive method preferably includes irradiating X-rays onto the specimen with variable incident angles relative to the said specimen within each of a plurality of planes that respectively intersect with the said specimen with respective different angles relative to the said specimen, so that it may be easy to detect the X-rays diffracted from the first and second crystallographic planes that extend diagonally from each other.

Moreover, the inventive method preferably includes incrementing (or decrementing) the variable incident angles relative to the said specimen within an angle range between the incident angle when the said first X-rays have come into the said specimen and the incident angle when the said second X-rays have come into the said specimen. By changing the incident X-rays within such range, it is possible to detect the X-rays diffracted from other crystallographic planes than the said first and second crystallographic planes.

Furthermore, the said plurality of planes intersect each other and have respective tilting angles in a range of 0 to 90 degrees relative to the said specimen, and the inventive method preferably includes incrementing (or decrementing) the said variable incident angles within a range of angles of 0 to 90 degrees. In this way, the crystal structure can be analyzed more in detail.

The inventive method may comprise tilting the said specimen with variable tilting angles relative to one plane that intersects with the said specimen, irradiating the X-rays having variable incident angles within the said one plane onto the respective specimen tilted with one of the said variable tilting angles and detecting the said X-rays that are diffracted with the said specimen. In the embodiment, one plane that intersects with the specimen is considered. By also changing the tilting angle and the incident angle relative to the said one plane, it is possible to detect the strength of the X-rays diffracted from the first and second crystallographic planes that extend diagonally from each other. Therefore, the crystal structure can be analyzed more in detail in comparison with the conventional method.

Furthermore, in the inventive method, the said specimen is preferably a bismuth layer structured compound. The bismuth (Bi) layer compound may contain various crystal phases such as a SBT phase, a fluorite phase and a pyrochlore phase. If there is a possibility that a specimen may contain such multiple crystal phases, the conventional methods have difficulties in discriminating the crystal phase of the specimen. The inventive method can distinguish the crystal structure of the specimen very precisely even if the specimen (e.g., Bi-layer compound) contains various crystal phases.

DETAILED DESCRIPTION OF THE INVENTION

Although a specimen of SBT thin film is used as an example for analyzing its crystal structure in the following embodiment of the invention, any other specimen, if it forms a crystal structure, may be used as a specimen for the crystal structure analysis method in accordance with the invention.

Figure 1:
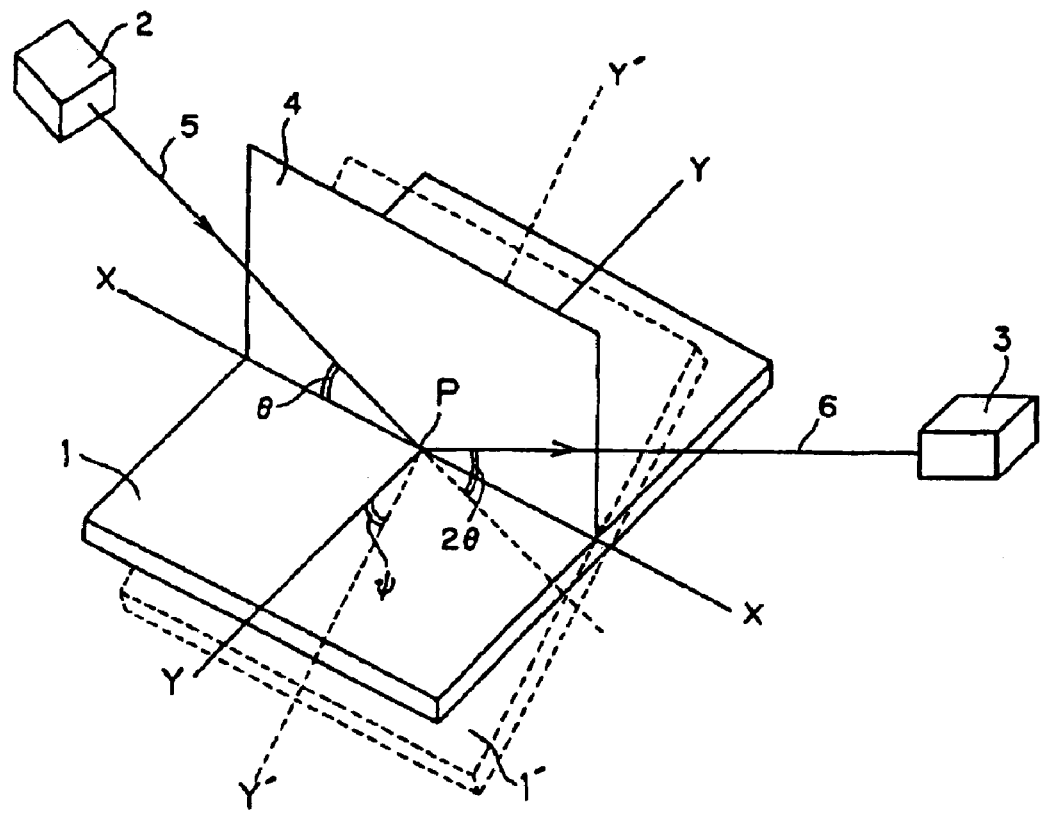
FIG. 1 is a schematic block diagram illustrating the crystal structure analysis method for analyzing the crystal structure of the SBT thin film in accordance with the embodiment of the invention.

FIG. 1 illustrates how to analyze a crystal structure of the SBT thin film using the crystal structure analysis method in accordance with an embodiment of the invention. The inventive method analyzes the crystal structure by applying the conventionally well-known X-ray diffraction method using θ-2θ scan.

A SBT thin film 1 is shown in FIG. 1. The SBT thin film 1 is placed in a plane defined by orthogonal axes of an X—X axis and a Y—Y axis that intersect each other at a point of intersection P. The SBT thin film 1 can be freely tilted by means of some rotation around the X—X axis as a pivot. An angle ψ formed between the Y—Y axis and the Y'-Y' axis (see FIG. 1) represents a tilting angle of the SBT thin film 1 when the SBT thin film 1 is tilted from one lie where the SBT thin film 1 is placed horizontally along the Y—Y axis (as illustrated by solid lines) to another lie where the SBT thin film 1 is placed along with the Y'-Y' axis. The SBT thin film 1' tilted with a tilting angle ψ is shown by dotted lines in FIG. 1. Here consider a plane 4 that contains the X—X axis and extends in a perpendicular direction relative to the SBT thin film 1 placed horizontally. Within the plane 4, an incident X-ray 5 is irradiated from an X-ray device 2 onto a predetermined point P with a variable incident angle θ relative to the SBT thin film 1. Additionally, within the plane 4, a detector 3 is provided in a direction tilted with a scattering angle 2θ relative to the incident direction of the incident X-ray 5 in order to detect a scattered X-ray 6 that are scattered from the SBT thin film 1. Thus, once the incident X-ray 5 has been irradiated onto the SBT thin film 1, the X-ray 6 scattered toward the direction that is tiled with a scattering angle 2θ relative to the incident direction of the incident X-ray 5 can be detected by the detector 3. In the embodiment of the invention, the tilting angle ψ is varied (incremented or decremented) by one degree within a range of $0 \text{ degree} \leq \psi \leq 90$ degrees. For each incremented (or decremented) value of the tilting angle by one degree, the incident angle θ of the incident X-ray 5 is varied (incremented or decremented) within a range of $0 \text{ degree} \leq \theta \leq 90$ degrees and then the scattered X-ray 6 from the SBT thin film 1 is detected by the detector 3. Such change of the incident angle θ may be performed by means of either tilting the SBT thin film toward the θ direction or moving the X-ray device 2 toward the θ direction. In the case, the X-ray 6 scattered toward the direction that is tilted with the scattering angle 2θ can be detected by the detector 3 being moved toward the θ (2θ) direction.

Figure 2:
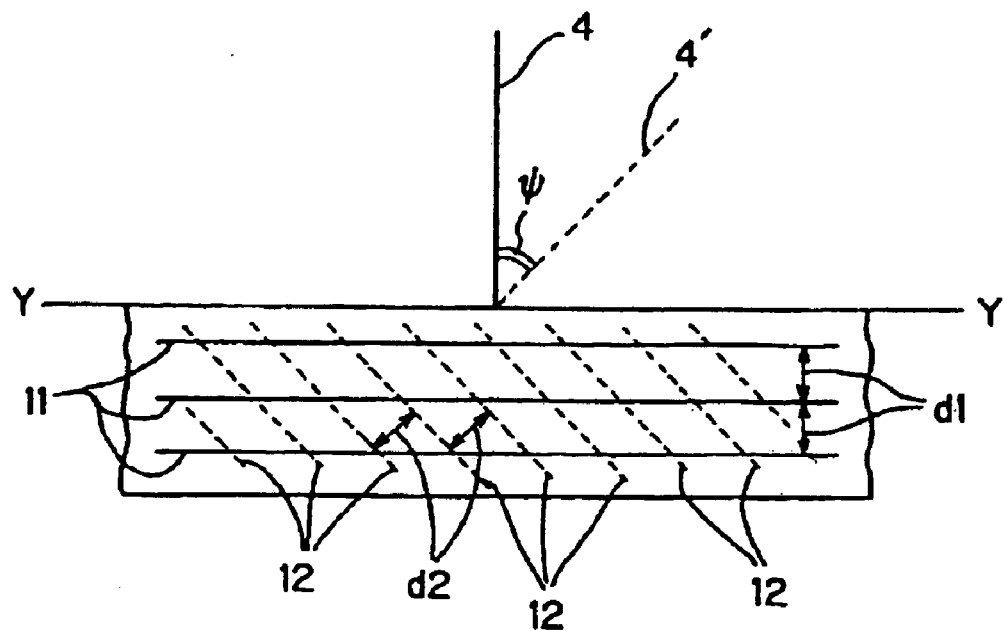
FIG. 2 is a schematic block diagram of the SBT thin film 1, supported horizontally (ψ=0), in a view in the X—X axis direction.

FIG. 2 illustrates a schematic view of the SBT thin film 1, from the X—X axis direction, which is supported horizontally (ψ=0). Consider a case in which a plurality of crystallographic planes 11 (shown in solid lines) align in parallel with the surface of the SBT thin film 1 when the tilting angle ψ of the SBT thin film is set to zero (ψ=0). The crystallographic plane distance of the crystallographic planes 11 is d1. It should be noted that the plane 4 extends perpendicularly relative to the crystallographic planes 11 and also extends so as to contain both of the incident X-ray 5 emitted from the X-ray device 2 and the scattered X-ray 6 detected by the detector 3 (the plane 4 will be referred to as scattering plane hereinafter). In this case, the detector 3 detects the scattered X-rays 6 that are scattered from the crystallographic planes 11. Thus, if the incident angle θ and the crystallographic plane distance d1 of the crystallographic planes 11 satisfy the Bragg's law of the following equation (1), the scattered X-rays 6 that are diffracted from each of the crystallographic planes 11 may be mutually strengthened and a resultant strengthened scattered X-ray 6 can be detected by the detector 3.

$$2d\sin\theta = n\lambda \qquad (1)$$

where d represents a crystallographic plane distance, θ represents an incident angle and λ represents a wavelength of the X-ray.

The wavelength is known, and the incident angle θ is also known because the incident angle is the angle of the incident X-ray 5 corresponding to the scattered X-ray 6 detected by the detector 3. Accordingly, the crystallographic plane distance d1 of the crystallographic planes 11 can be obtained in accordance with equation (1).

On the other hand, in another case that a plurality of crystallographic planes 12 (shown in dotted lines in FIG. 2) that align diagonally relative to the crystallographic planes 11, keeping a crystallographic plane distance d2 among them, the X-rays that are scattered from these crystallographic planes 12 may be scattered toward the outside of the plane 4. Therefore, even if the incident angle θ is changed, the X-rays that are scattered from the crystallographic plane 12 cannot be detected and accordingly the crystallographic plane distance d2 cannot be obtained. In other words, when there exist crystallographic planes 11 and crystallographic planes 12 that extend diagonally each other, only the information regarding either of these two planes can be obtained if only the incident angle θ is incremented or decremented.

Figure 3:
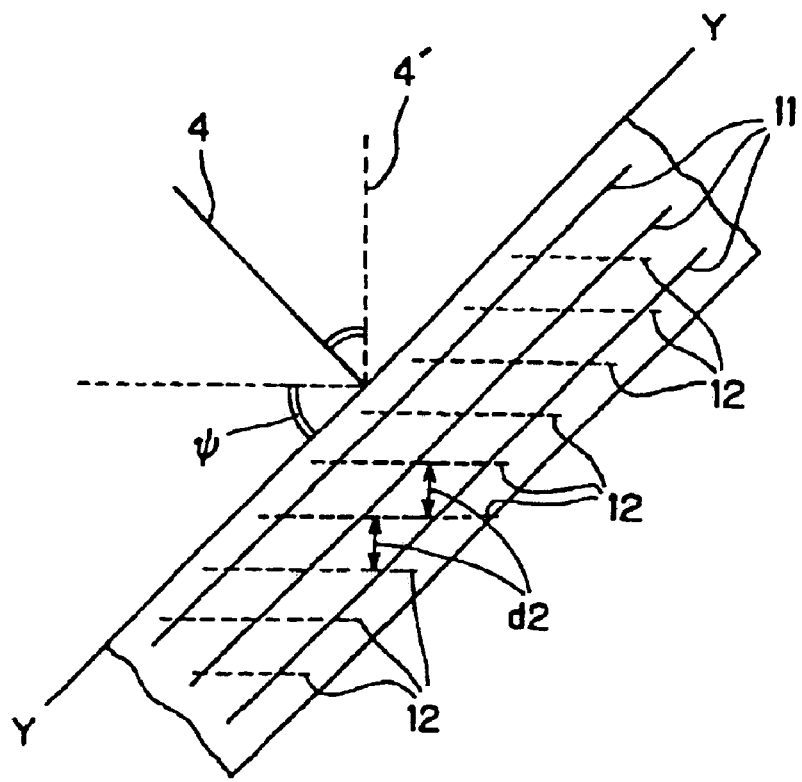
FIG. 3 is a schematic block diagram of the SBT thin film 1, tilted with a tilting angle ψ, in a view in the X—X axis direction.

Therefore, in the embodiment of the invention, the tilting angle ψ is varied in addition to the incident angle θ. Here consider another plane 4' (shown as a dotted line in FIG. 2) that extends in a perpendicular direction relative to the crystallographic planes 12 in addition to the plane 4 that extends in a perpendicular direction relative to the crystallographic planes 11. If the SBT thin film 1 is rotated around the X—X axis so as to be tilted with a tilting angle ψ (see FIG. 1), the crystallographic planes 12, instead of the crystallographic planes 11, are positioned horizontally as illustrated in FIG. 3. Thus, the path of the incident X-ray 5 and the scattered X-ray 6 goes out of the plane 4 that is vertical relative to the crystallographic planes 11 but the path of the incident X-ray 5 and the scattered X-ray 6 is formed within the plane 4' that is vertical relative to the crystallographic planes 12. In this way, by tilting the SBT thin film 1, it becomes possible to obtain the information regarding the crystallographic planes 12 (e.g., the crystallographic plane distance d2) as well as the information regarding the crystallographic planes 11 (e.g., the crystallographic plane distance d1). Although the SBT thin film 1 itself is rotated in order to change the tilting angle ψ in this embodiment, the X-ray device 2 and the detector 3, instead of the SBT thin film 1, may be alternatively rotated for that purpose.

It is well known that the SBT thin film 1 contains in most cases a crystal phase that is called a SBT phase. However, in same cases, it contains another crystal phase that is called a fluorite phase. It is widely recognized that the SBT phase tends to have (115) preferred orientation (namely, (115) plane is easily oriented parallel to the surface of the substrate where the SBT thin film 1 is formed) and the fluorite phase tends to have (111) preferred orientation. When the X-ray scattered from the plane (115) of the SBT phase satisfies the Bragg's law, the scattering angle 2θ is 28.9 degrees whereas the scattering angle 2θ is 27.9 degrees when the X-ray scattered from the plane (111) of the fluorite phase satisfies the Bragg's law. Accordingly, when the plane (115) of the SBT phase and the plane (111) of the fluorite phase both satisfy the Bragg's law, it is difficult to determine whether the diffracted X-ray is from the plane (115) of the SBT phase or from the plane (111) of the fluorite phase on the basis of only the diffracted x-ray that is gained around the scattering angle 2θ=28 degrees since the scattering angles (2θ) for both planes are approximately equal as described above. Besides, the SBT thin film 1 may sometimes contain both the SBT phase and the fluorite phase together dependent on the forming conditions such as the variation of the temperature. Thus, even if the diffracted x-rays can be captured around the scattering angle 2θ=28 degrees, the conventional 0–2θ method cannot analyze the crystal structure of the SBT thin film 1 sufficiently because there are possibilities that not only one of SBT phase and fluorite phase exist but also both the SBT phase and the fluorite phase may co-exit together in the SBT thin film 1. Moreover, the orientation of the crystal phases of the SBT thin film 1 may vary in response to the change of the forming conditions of the SBT thin film 1 or the mixture ratio of such constituent elements of the SBT thin film 1 as Si, Bi, Ta and O. This may also cause the difficulty in analyzing the crystal structure of the SBT thin film 1.

In the embodiment of the invention, however, not only the incident angle θ but also the tilting angle ψ are changed so as to obtain the information about both the crystallographic plane 11 and the crystallographic plane 12 that are diagonally aligned each other. Based on such information, it is possible to discriminate the crystal phase of the SBT thin film 1. The following will explain how to discriminate the crystal phase of the SBT thin film based on the information that is obtained through the change of not only the incident angle θ but also the tilting angle ψ.

Figure 4:
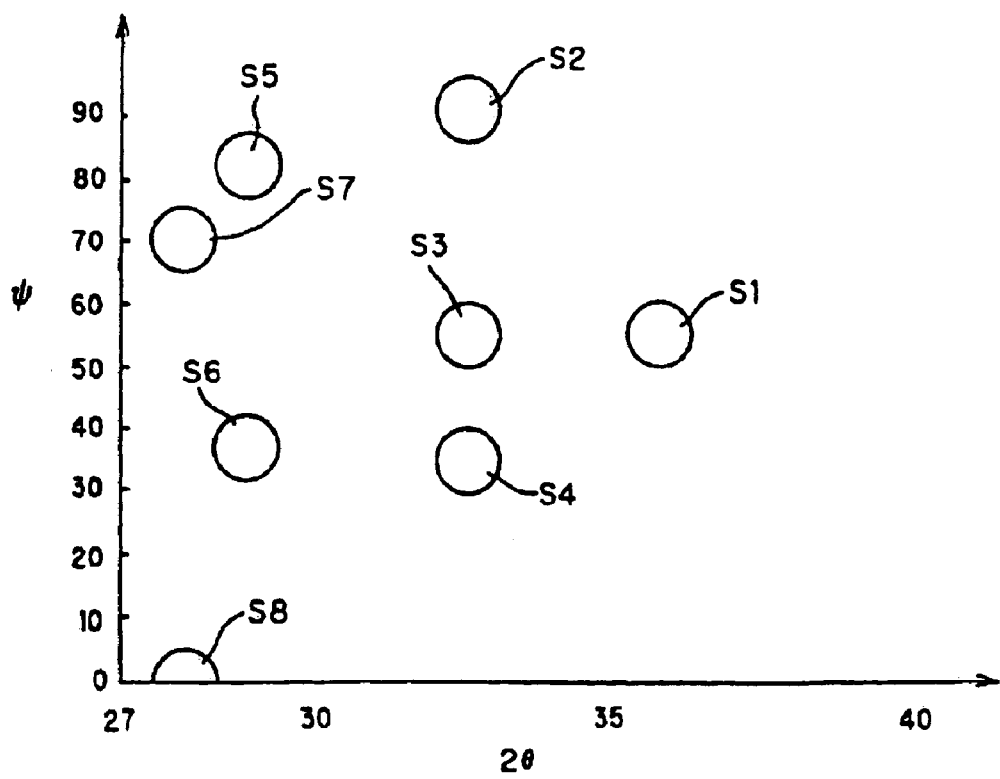
FIG. 4 is a graphical chart to show the result of the measurement of the diffraction strength of the X-rays detected by detector 3.

In order to discriminate the crystal phase of the SBT thin film 1, the method in accordance with the embodiment of the invention is to irradiate the X-rays onto the SBT thin film 1 while incrementing (or decrementing) both the incident angle θ and the tilting angle ψ, detect the diffracted X-rays by the detector 3 and measure the distribution of the strength of the detected X-rays. FIG. 4 shows a result of the measurement for the distribution of the diffraction strength of the X-rays detected by the detector 3.

The measurement for the distribution of the diffraction strength of the X-rays shown in FIG. 4 was done as follows: increment (or decrement) the tilting angle ψ by one degree in a range of 0 degree≦ψ≦90 degrees; for each incremented (or decremented) tilting angle ψ by one degree, irradiate the X-rays onto the SBT thin film 1 with the incident angle θ being incremented (or decremented) by 0.025 degrees in a range of 0 degree≦θ≦90 degrees; and detect the X-rays diffracted from the SBT thin film 1 by the detector 3. The vertical axis of the graph shown in FIG. 4 represents 2θ in a range of 27 degree≦2θ≦40 degrees and the horizontal axis represents ψ-θ in a range of 0 degree≦ψ≦90 degrees.

As seen in FIG. 4, there are spots S1 through S8 positioned at different locations corresponding to the respective values of 2θ and ψ. If the value of 2θ is given, the corresponding crystallographic plane distance d can be solved in accordance with the Bragg's law shown in the above equation (1). At first, consider the vicinity of 2θ≈36 degrees in the graph of FIG. 4. In that vicinity, there is only one spot S1. By applying 2θ≈36 degrees to the Bragg equation (1), d≈0.243 nm is obtained. The crystallographic planes that align with the crystallographic plane distance d≈0.243 nm never exist in the fluorite phase but exist in the SBT phase, and said crystallographic planes has the (0010) plane. Therefore, this will lead to a realization that the SBT phase is formed on the concerned SBT thin film 1 since one spot S1 is found in the vicinity of 2θ=36 degrees,.

In addition, it can be observed that the spot S1 exist in the vicinity of ψ=56 degrees. Accordingly, it is possible to determine that the (0010) plane of the SBT phase aligns with a tilting angle of 56 degrees relative to the surface of SBT thin film 1. In this way, if the tilting angle of one crystallographic planes is known, it is also possible to know the tilting angle for other crystallographic planes. For example, as for the SBT phase, the crystallographic planes that exit with a tilting angle 56 degrees relative to the (0010) plane (namely, those exist with the tilting angle ψ=0 degree) are (103) and (217) planes. So, it is found that the SBT thin film 1 has the SBT phase in which (103) plane or (217) plane is preferentially oriented parallel to the surface of this SBT thin film 1.

Next, consider the vicinity of 2θ=33 degrees in the graph of FIG. 4. There appear spots S2, S3 and S4 in the vicinity of 2θ=33 degrees, which indicates that the SBT thin film 1 contains crystallographic planes aligning with a crystallographic plane distance d≈0.271 nm. Both SBT phase and fluorite phase can have crystallographic planes having a crystallographic plane distance d≈0.271 nm. More specifically, the (200) plane of the SBT phase has a crystallographic plane distance d≈0.277 nm, on the other hand, the (200) plane of the fluorite phase has a crystallographic plane distance d≈0.272 nm. Here, according to the above consideration for the vicinity of 2θ=36 degrees, it should be reminded that the (103) plane or (217) plane of the SBT phase exists in parallel with the surface of this SBT thin film 1. For example, if there exists the (217) plane of the SBT phase in parallel with the surface of this SBT thin film 1, the (200) plane of the SBT phase must be observed in the vicinity of ψ=68 degrees. However, there exists no spot in the vicinity of ψ=68 degrees. Also, if there exists the (103) plane of the SBT phase in parallel with the surface of this SBT thin film 1, the (200) plane of the SBT phase must be observed in the vicinities of ψ=35 degrees and ψ=90 degrees. As seen in FIG. 4, there appear the spot S2 in the vicinity of ψ=90 degrees and the spot S4 in the vicinity of ψ=35 degrees. So, it can be found that these spots S2 and S4 have been measured by detecting the X-rays scattered from the (200) plane of the SBT phase, and that there exists the (103) plane of the SBT phase in parallel with the surface of the concerned SBT thin film 1.

Furthermore, consider the vicinity of 2θ=28–29 degrees in the graph of FIG. 4. There appear spots S5 through S8 in the vicinity of 2θ=28–29 degrees, which indicates there are crystallographic planes having a crystallographic plane distance d≈0.313 nm in the SBT thin film 1. Both SBT phase and fluorite phase can have crystallographic planes having a crystallographic plane distance d≈0.313 nm. More specifically, the (115) plane of the SBT phase has a crystallographic plane distance d≈0.308 nm, on the other hand, the (111) plane of the fluorite phase has a crystallographic plane distance d≈0.314 nm. With respect to the SBT phase, the (115) plane appears at the positions tilted about 35 degrees and 83 degrees relative to the (103) plane. Therefore, it can be determined that spots S5 and S6 among the spots S5 through S8 appearing in the vicinity of 2θ=28–29 degrees have been measured by detecting the X-rays scatterd from the (115) plane of the SBT phase.

Here consider the vicinity of 2θ=33 degrees again. Because it has been determined that these spots S2 and S4 of S2 through S4 have been measured by detecting the X-rays diffracted from the crystallographic plane of the SBT phase, the remaining spot S3 must be resulted by diffraction from the (200) plane of the fluorite phase. Similarly, because it has been determined that spots S5 and S6 of S5 through S8 have been measured by detecting the X-rays scattered from the crystallographic plane of the SBT phase, the remaining spots S7 and S8 must be resulted by the diffraction from the (111) plane of the fluorite phase.

Thus, it is found that the SBT phase and the fluorite phase coexist within the SBT thin film 1. Besides, it is possible to obtain a ratio of the mixture of the SBT phase and the fluorite phase by applying, for example, the area ratio of the spot 6 and the spot 8 that appear in the vicinity of 2θ=28–29 degrees. For example, if we consider a SBT thin film containing a mixture of the SBT phase and the fluorite phase with their mixture ratio of 1:1, the area ratio of the spot S6 and the spot S8 of such SBT thin film should be 1:36 according to a theoretical calculation. Thus, if the area ratio of the spot S6 and the spot S8 in FIG. 4 is 1:1, it can be concluded that the ratio of the SBT phase versus the fluorite phase should be 36:1.

As described above, an X-ray diffracted from the (115) plane of the SBT phase appears in the vicinity of 2θ=28.9 degrees and also an X-ray diffracted from the (111) plane of the fluorite phase appears in the vicinity of 2θ=27.9 degrees. So, even if the conventional θ-2θ method, which has been commonly used to analyze crystal structures, can detect any diffracted X-ray in the vicinity of 2θ=28 degrees, the conventional method may not be able to distinguish whether the detected X-ray has been diffracted from the (115) plane of the SBT phase or from the (111) plane of the fluorite phase, and accordingly the conventional method cannot discriminate the crystal phase of the SBT thin film 1. In contrast, the inventive method can discriminate the crystal phase of the SBT thin film 1 by means of changing ψ in addition to θ as described above.

In the above-described embodiment of the invention, the tilting angle ψ of SBT thin film 1 is incremented or decremented by one degree in a range of 0 degree≦ψ≦90 degrees while the incident angle θ of the incident X-ray 5 is incremented or decremented by 0.025 degrees in a range of 0 degree≦θ≦90 degrees. However, the incremented or decremented amount of the variable angles θ, ψ and the angle range of the variable angles θ, ψ may be dependent on the extent of the desired details of the crystal structure analysis. Besides, in the embodiment of the invention, the SBT thin film 1 is tilted around the X—X axis that intersects orthogonally with the Y—Y axis, but it may be tilted around another axis that intersects diagonally with the Y—Y axis.

Furthermore, in the embodiment of the invention for the crystal structure analysis, the incident angle θ of the X-ray is varied within a plane 4 whereas the tilting angle ψ of the SBT thin film 1 is varied within a plane that contains the Y—Y and Y'-Y' axes and intersects orthogonally with the plane 4. However, while the incident angle θ of the X-ray is varied within a plane 4 in the same manner, the tilting angle ψ of the SBT thin film 1 may be changed by means of tilting the SBT thin film 1 around the Y—Y axis (namely, the tilting angle of the thin film 1 may be changed in the direction of the incident angle θ within the plane 4). Even in such way, it is possible to detect the strength of the X-rays diffracted from the crystallographic planes that have different crystallographic plane and extend diagonally each other, and accordingly to analyze the crystal structure in more detail than the conventional method.

Consequently, the crystal structure analysis method in accordance with the invention can advantageously analyze crystal structures in detail.

What is claimed is:

1. A crystal structure analysis method comprising the steps of:

irradiating X-rays onto a specimen having a crystal structure;

detecting said X-rays that are diffracted from said specimen; and analyzing said crystal structure of said specimen based on the strength of said detected X-rays, wherein said step of analyzing said crystal structure of said specimen is performed using the strength of a plurality of first X-rays diffracted from a plurality of first crystallographic planes that align so as to keep a first crystallographic plane distance between each plurality of first crystallographic planes and the strength of a plurality of second X-rays diffracted from a plurality of second crystallographic planes that extend diagonally relative to said plurality of first crystallographic planes and align so as to keep a second crystallographic plane distance between each plurality of second crystallographic planes.

2. The crystal structure analysis method of claim 1, wherein said step of detecting said X-rays involves detecting said X-rays diffracted from said specimen after having irradiated X-rays onto said specimen with variable incident angles relative to said specimen within each of a plurality of planes that respectively intersect with said specimen with respective different angles relative to said specimen.

3. The crystal structure analysis method of claim 2, wherein said variable incident angles relative to said specimen are incremented or decremented in an angle range between the incident angle when said plurality of first X-rays have come into said specimen and said incident angle when said plurality of second X-rays have come into said specimen.

4. The crystal structure analysis method of claim 3, wherein said plurality of planes intersect each other and have respective tilting angles in a range of 0 to 90 degrees relative to said specimen, and wherein said variable incident angles are incremented or decremented in a range of angles of 0 to 90 degrees.

5. The crystal structure analysis method of claim 4, wherein the said specimen is a bismuth layer structured compound.

6. The crystal structure analysis method of claim 2, wherein the said specimen is a bismuth layer structured compound.

7. The crystal structure analysis method of claim 3, wherein the said specimen is a bismuth layer structured compound.

8. The crystal structure analysis method of claim 1, further comprising the steps of:

tilting said specimen with variable tilting angles relative to one plane that intersects with said specimen;

irradiating said X-rays having variable incident angles within said one plane onto the respective specimen tilted with one of said variable tilting angles; and detecting said X-rays that are diffracted with said specimen.

9. The crystal structure analysis method of claim 8, wherein the said specimen is a bismuth layer structured compound.

10. The crystal structure analysis method of claim 1, wherein the said specimen is a bismuth layer structured compound.

* * * * *

UNITED STATES PATENT AND TRADEMARK OFFICE
CERTIFICATE OF CORRECTION

PATENT NO. : 6,738,717 B2
DATED : May 18, 2004
INVENTOR(S) : Saito

It is certified that error appears in the above-identified patent and that said Letters Patent is hereby corrected as shown below:

Title page,
Item [57], ABSTRACT,
Line 6, please delete "0 degree $\leq$ y $\leq$ 90 degrees," and insert
-- 0 degree $\leq$ y $\leq$ 90 degrees, --.
Line 9, please delete "0 degree $\leq$ 0 $\leq$ 90 degrees," and insert
-- 0 degree $\leq$ 0 $\leq$ 90 degrees --.

Signed and Sealed this

Second Day of August, 2005

JON W. DUDAS
*Director of the United States Patent and Trademark Office*